United States Patent [19]

Fukaya

[11] Patent Number: 5,533,942
[45] Date of Patent: Jul. 9, 1996

[54] SPEED CHANGE GEARS ADOPTING INTERNAL-MESHING PLANETARY GEAR CONSTRUCTION

[75] Inventor: Sueo Fukaya, Ohbu, Japan

[73] Assignee: Sumitomo Heavy Industries Ltd., Tokyo, Japan

[21] Appl. No.: 219,938

[22] Filed: Mar. 30, 1994

[30] Foreign Application Priority Data

Apr. 5, 1993 [JP] Japan .................................. 5-077992

[51] Int. Cl.$^6$ ........................................................ F16H 1/32
[52] U.S. Cl. ............................................................ 475/178
[58] Field of Search .................................... 475/162, 178, 475/179, 176, 177, 346

[56] References Cited

U.S. PATENT DOCUMENTS 1,144,092  6/1915  Apple ........................ 475/178
3,208,293  9/1965  Boehm ....................... 475/176

FOREIGN PATENT DOCUMENTS 0444790  4/1991  European Pat. Off. .
2004872  2/1971  France .

Primary Examiner—Rodney H. Bonck
Assistant Examiner—Sherry Estremsky
Attorney, Agent, or Firm—Nikaido Marmelstein Murray & Oram

[57] ABSTRACT

Speed change gears wherein an external gear (103 in FIG. 1) is protrusively formed with a plurality of inner pins (103b) of circular cylindrical shape. The rotation of the external gear (103) corresponding to a rotational component on the axis thereof after the absorption of the rocking thereof is directly derived from a pinion gear (106). The pinion gear (106) is formed with inner pin holes (106a) into which the respectively corresponding inner pins (103b) can be loosely fitted. The power is transmitted to or from an opposite gear (27) through the pinion gear (106).

3 Claims, 5 Drawing Sheets

SPEED CHANGE GEARS ADOPTING INTERNAL-MESHING PLANETARY GEAR CONSTRUCTION

BACKGROUND OF THE INVENTION

1. Field of the Invention

The present invention relates to speed change gears adopting an internal-meshing planetary gear construction. The speed change gears are usually used as reduction gears, but they serve as speedup gears when their input and output are reversed.

2. Description of the Prior Art

Heretofore, reduction gears adopting an internal-meshing planetary gear construction as illustrated in FIG. 5 have been proposed in, for example, Japanese Patent Application Laid-open No. 272348/1991 or No. 244852/1991 or Japanese Utility Model Registration Application Laid-open No. 47454/1990.

In the reduction gears, all members are made of plastics, and the rotation of an input shaft 1 is derived as the reduced speed rotation of an output shaft 8 (a pinion gear 9).

The input shaft 1 is integrally formed with an eccentric element 2, round which an external gear 3 is rotatably supported.

The external gear 3 is integrally provided with external teeth 3a of trochoidal tooth profile at its outer periphery. Besides, a plurality of inner pins 3b in the shape of a circular cylinder are formed integrally with the external gear 3 so as to protrude on a circumference which is coaxial with the input shaft 1.

An internal gear 4 is integrally formed with teeth of circular-arc tooth profile 4a which internally mesh with the external teeth 3a of the external gear 3. The internal gear 4 serves also as a main casing, and is accordingly held in a fixed state in the exemplified reduction gears.

One end part of the output shaft 8 is integrally formed with a disc-shaped flange part 8d. The flange part 8d is formed with inner pin holes 8a in which the respective inner pins 3b are loosely fitted.

The output shaft 8 is supported by the supporting part 7a of a support cover 7, while the input shaft 1 is rotatably supported in a bearing hole 8c which is formed in the end part of the output shaft 8. In addition, the pinion gear 9 is assembled to the other end part 8b of the output shaft 8 remote from the flange part 8d so as to rotate along with the output shaft 8 and not to come away therefrom.

Next, the operation of the prior-art reduction gears will be briefly explained. When the input shaft 1 is rotated by one revolution, the eccentric element 2 also rotated by one revolution. Owing to the revolution of the eccentric element 2, the external gear 3 is about to rotate rockingly (swayingly) around the input shaft 1. Since, however, the external gear 3 has the rotation on its own axis restrained by the internal gear 4, it undergoes almost only rocking (swaying), internally meshing with the internal gear 4.

By way of example, assuming now the numbers of the teeth of the external gear 3 and the internal gear 4 to be N and (N+1), respectively, the difference between the numbers of the teeth is 1 (one). Consequently, the external gear 3 shifts (rotates on its own axis) to the amount of one tooth relative to the internal gear 4 (held in the fixed state) every revolution of the input shaft 1. This signifies that the rotation of the input shaft 1 is reduced to −1/N of the rotating speed of the external gear 3 (where the minus sign indicates the reverse rotation).

The rocking (swaying) component of the rotation of the external gear 3 is absorbed by clearances respectively defined between the inner pins 3b and the corresponding inner pin holes 8a, and only the component of the rotation of the same 3 on the axis thereof is transmitted to the output shaft 8 through the inner pins 3a. As a result, the speed reduction at the reduction gear ratio of −1/N is ultimately achieved.

The rotation of the output shaft 8 is transmitted to the pinion gear 9 which is fixed to the end part 8b of this output shaft 8. Since the gear 27 of a machine opposite to the reduction gears is held in mesh with the pinion gear 9, the output of these reduction gears is transmitted to the opposite (mating) machine.

The reduction gears of the internal-meshing planetary gear type as stated above, however, has the problem that the pinion gear 9 needs to be separately prepared for the purpose of permitting the power-wise connection of the reduction gears with the opposite machine. This problem is ascribable to the fact that, when the pinion gear 9 formed with external teeth is molded integrally with the output shaft 8 beforehand, the assembly of the reduction gears (especially, the assembly of the support cover 7) becomes impossible.

Another problem is that, in the case of separately assembling the pinion gear 9 to the output shaft 8 as stated above, the reduction gears need to be furnished with mechanisms (functions) which prevent the pinion gear 9 from rotating relative to the output shaft 8 and from coming away from the output shaft 8.

A further problem is that, since the reduction gears receive a reaction (momental load) from the side of the gear 27 of the opposite machine, they structurally need to prolong the output shaft supporting part 7a of the support cover 7 and to ensure a high rigidity for the supporting part 7a, so the overall length and the weight thereof increase.

A still further problem is that, since the output shaft has the flange part 8d and presents a complicated shape in three dimensions as apparent from the figure, the handling thereof during storage and transportation is inconvenient. The support cover 7 which presents such a complicated shape has the similar problem.

SUMMARY OF THE INVENTION

The present invention has been made in view of the problems of the prior art as mentioned above, and has for its object to decrease the number of components, to eliminate the inconvenient handling of the components and to attain a shorter overall length and a lighter weight in speed change gears adopting an internal-meshing planetary gear construction (especially, made of plastics).

The present invention solves the problems by speed change gears adopting an internal-meshing planetary gear construction, comprising a first shaft, an eccentric element with which said first shaft is provided, an external gear which is arranged on an outer periphery of said eccentric element, an internal gear which internally meshes with said external gear, means for absorbing rocking of said external gear, and a second shaft which is connected to said external gear through the absorption means, wherein a plurality of inner pins in a circular cylindrical shape are formed on said external gear so as to protrude at points on a circumference which is coaxial with said first shaft; said second shaft is formed in a ring shape, and is assembled coaxially with said first shaft; the ring-shaped second shaft is formed with inner pin holes into which said plurality of inner pins are loosely fitted, respectively, and it is also formed with external teeth at an outer peripheral part of the ring; and power transmission with a mating machine which is opposite to said speed change gears is permitted through said external teeth formed at the outer periphery of said ring.

By the way, in this specification, the words "speed change gears" signify that the identical construction can be utilized both as the reduction gears and as the speedup gears by reversing the input/output relationship between the first shaft and the second shaft.

The present invention has drastically reformed the technical idea of the prior art that the reduced speed rotation is derived to the output shaft (the second shaft) through the flange part provided with the inner pin holes into which the respectively corresponding inner pins of the external gear are loosely fitted, and that the pinion gear for the connection with the opposite machine is mounted on the output shaft.

This is because, insofar as such a technical idea is resorted to, it is impossible to avoid the occurrences of the various problems stated before that the shape of the output shaft becomes complicated in three dimensions due to the flange formation, that the output shaft consequently needs to be supported through the support cover in the three-dimensionally complicated shape, that the supporting part of the support cover needs to be prolonged and to be kept highly rigid, and that the pinion gear separately prepared needs to be mounted on the output shaft with the functions which prevent the pinion gear from coming away from the output shaft, etc.

According to the present invention, in order to solve the above problems at one stroke, a member which corresponds to the flange part of the output shaft in the prior art is directly endowed with a function as the second shaft (an output shaft in the case of using the speed change gears as the reduction gears).

More specifically, the second shaft itself is formed in the shape of the ring and is assembled coaxially with the first shaft, the ring-shaped second shaft is formed with the inner pin holes into which the respectively corresponding inner pins are loosely fitted, and the external teeth are formed at the outer peripheral part of the ring. Power is directly transmitted to or from the opposite machine through the external teeth formed at the outer periphery of the ring.

Thus, it is permitted to omit the presence of that supporting part of the support cover which serves to support the second shaft with the high rigidity. In addition, it becomes unnecessary to separately prepare the ring gear and to especially mount the pinion gear prepared separately. Further, the length of the second shaft in the axial direction thereof can be shortened to below half of the length in the prior art. Moreover, a much higher rigidity than in the prior art can be ensured for the second shaft.

By the way, the speed change gears constructed as described above can further comprise a main casing which is unitary with said internal gear, and a sub casing which can be coupled with said main casing; wherein said external gear and said ring-shaped second shaft are accommodated between said main casing and said sub casing, and said casings are partially cut out so as to expose part of said second shaft to said opposite machine. In this case, the external gear and the second shaft can be assembled accurately and rigidly, and all the sliding parts can be favorably concealed. It is therefore permitted to effectively prevent dust etc. from invading the sliding parts and to attain a high durability.

Further, the speed change gears can be so constructed that said sub casing is protrusively formed with a cylindrical bearing part which is capable of supporting said first shaft, and that said second shaft is assembled onto an outer periphery of said bearing part. In this case, the first and second shafts can be supported without the mutual interferences of the rotations (reverse rotations) of the respective shafts, and the axial length of the speed change gears can be shortened still more.

As described above, in speed change gears adopting an internal-meshing planetary gear construction, the present invention brings forth the excellent effect that decrease in the number of components as well as the number of assembling steps, convenient handling during storage, transportation etc. based on simplified component shapes, a shorter axial length as well as a lighter weight, and so on can be realized at the same time.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, the embodiments of the present invention will be explained in detail with reference to the drawings.

Figure 1:
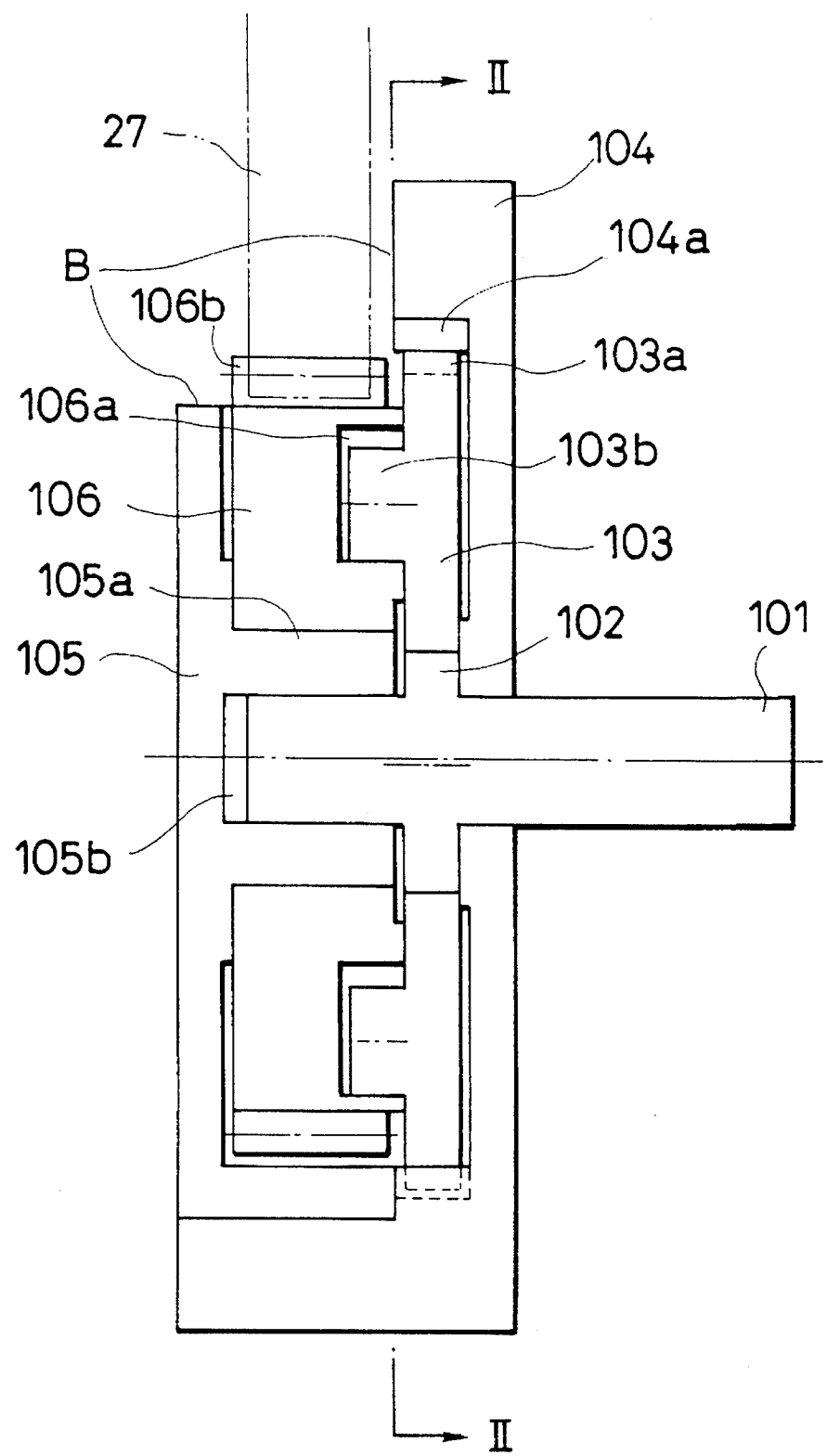
FIG. 1 is a sectional view showing an embodiment of reduction gears adopting an internal-meshing planetary gear construction according to the present invention.
Figure 2:
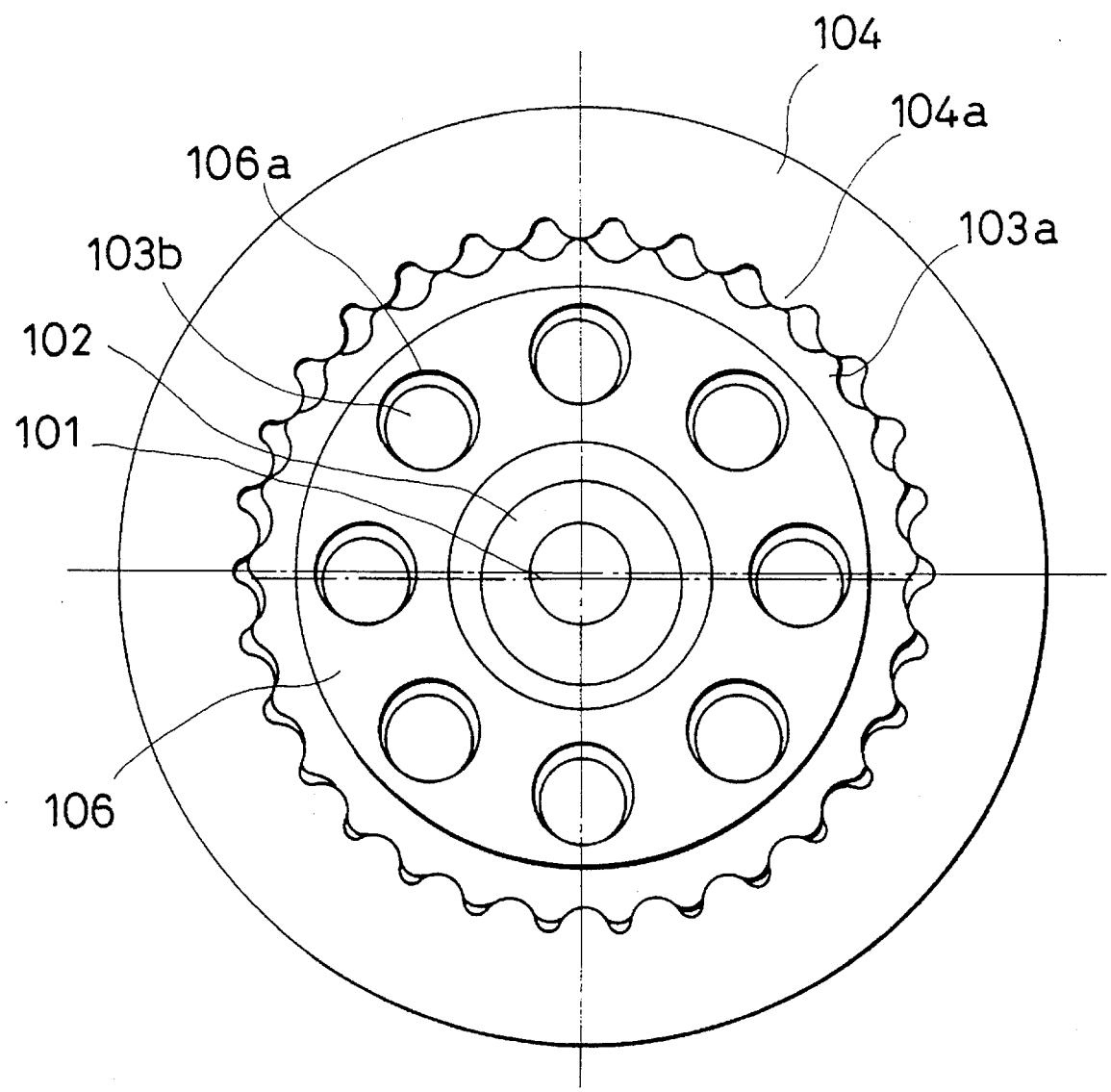
FIG. 2 is a sectional view taken along line II—II in FIG. 1.

FIG. 1 is a sectional view illustrative of the embodiment of reduction gears adopting an internal-meshing planetary gear construction according to the present invention, while FIG. 2 is a sectional view taken along line II—II in FIG. 1.

In this embodiment, the rotation of an input shaft (a first shaft) 101 is derived as the reduced speed rotation of a pinion gear (a second shaft in the shape of a ring) 106.

All the members of the reduction gears are formed of plastics.

The input shaft 101 is integrally formed with an eccentric element 102. An external gear 103 is rotatably supported around the eccentric element 102. The external gear 103 is integrally formed with external teeth 103a of trochoidal tooth profile at its outer periphery. Besides, a plurality of inner pins 103b in the shape of a circular cylinder are formed integrally with the external gear 103 so as to protrude on a circumference which is coaxial with the input shaft 101.

An internal gear 104 is integrally formed with teeth of circular-arc tooth profile 104a which internally mesh with the external teeth 103a of the external gear 103. The internal gear 104 serves also as a main casing, and is accordingly held in a fixed state in this embodiment.

The pinion gear 106 fulfills all the functions of the output shaft 8 (including the flange part 8*d*) and the pinion gear 9 separately mounted thereon in the prior art. It is provided with inner pin holes 106*a* in which the respectively corresponding inner pins 103*b* are loosely fitted, and it is rotatably assembled on the outer peripheral part of a cylindrical bearing part 105*a* which is formed so as to protrude inwards on a sub casing 105. The cylindrical bearing part 105*a* serves also as the bearing of the input shaft 101, and one end part of the input shaft 101 is rotatably inserted in the hole 105*b* of the bearing part 105*a*.

Owing to the presence of the bearing part 105*a*, the rotations (reverse rotations) of the input shaft 101 and the pinion gear 106 are favorably prevented from interfering with each other.

The sub casing 105 is fixed to the internal gear 104 serving also as the main casing, through a bolt (not shown). Only parts of both the casings 104 and 105 are cut out, and part of the pinion gear 106 is exposed to the cutout parts B. The gear 27 of a machine opposite to the reduction gears can mesh with the external teeth 106*b* of the pinion gear 106 at the exposed part thereof.

In the reduction gears of this embodiment, operations in power transmission proceeding from the input shaft 101 up to the pinion gear 106 are quite the same as the operations in the power transmission proceeding from the input shaft 1 up to the flange part 8*d* of the output shaft 8 in the prior art. In the prior art, the power is transmitted from the flange part 8*d* to the gear 27 of the opposite machine through the output shaft 8 and the pinion gear 9, whereas in this embodiment, power is directly transmitted from the pinion gear 106 to the gear 27 of the opposite machine as seen from the figures.

Next, the embodiment of the reduction gears of internal-meshing planetary gear construction, which are made of plastics, and with which a DC (direct-current) miniature motor is directly coupled, will be explained with reference to FIGS. 3 and 4.

Figure 3:
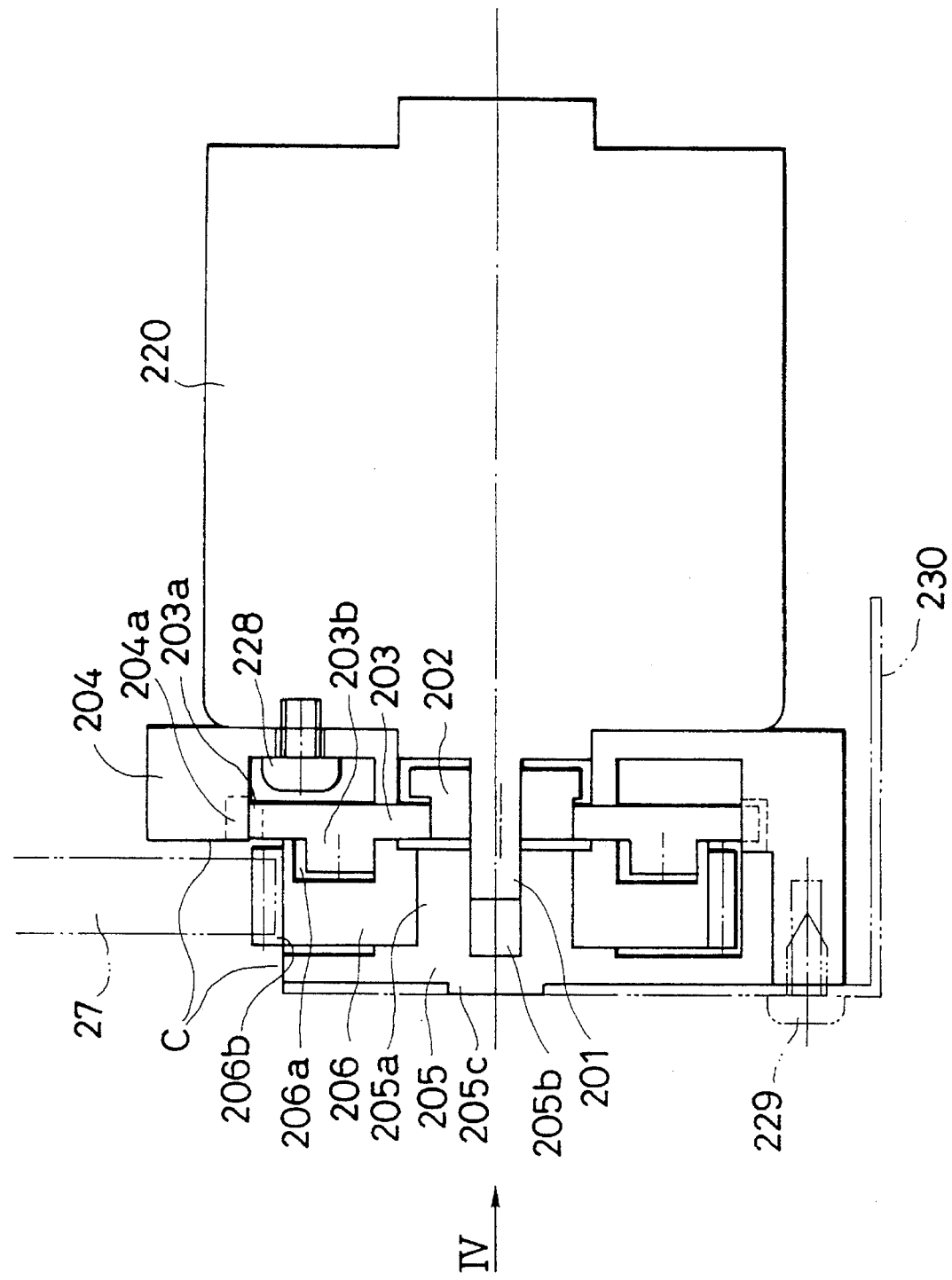
FIG. 3 is a sectional view showing another embodiment of the reduction gears adopting an internal-meshing planetary gear construction according to the present invention.
Figure 4:
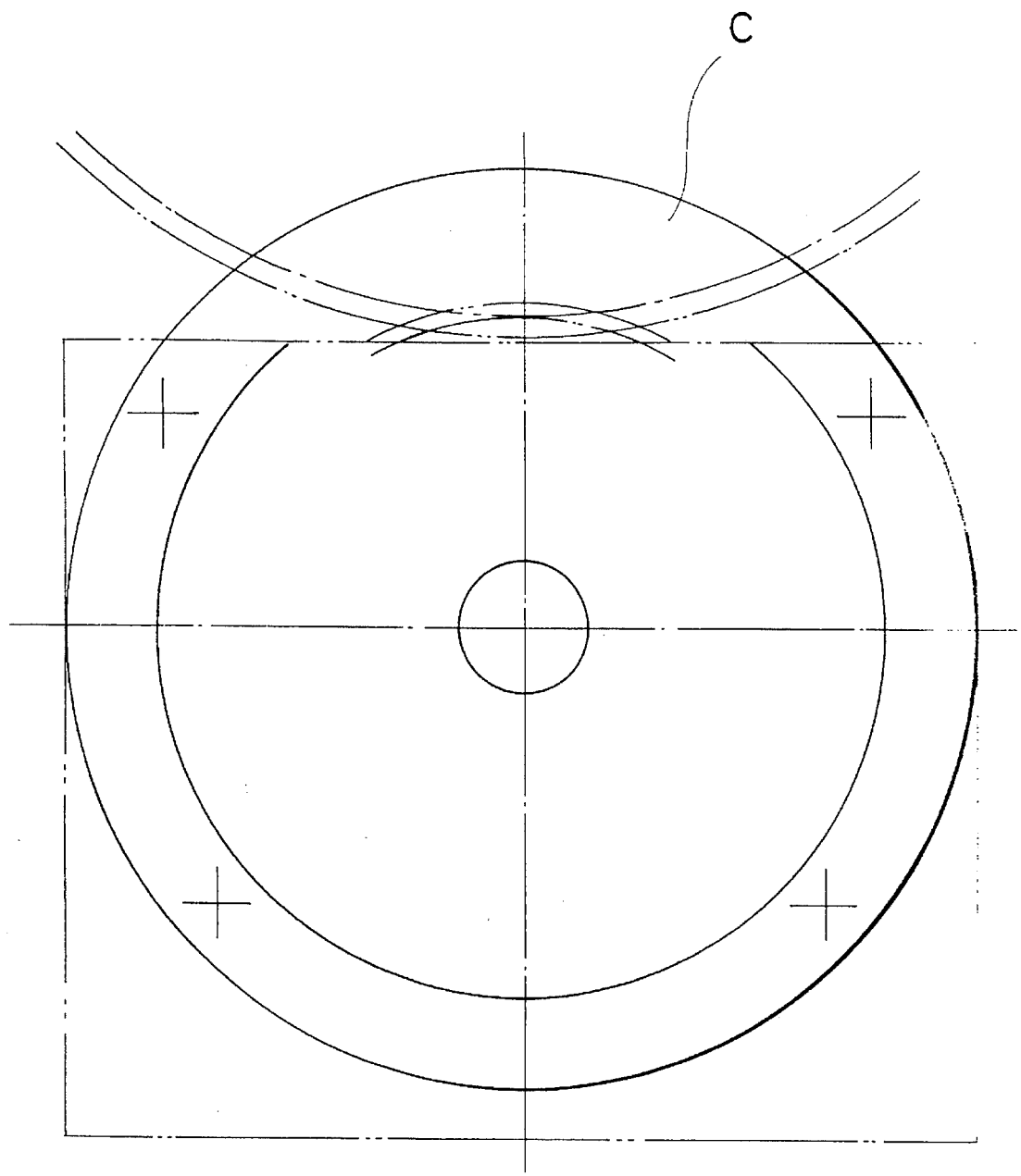
FIG. 4 is an exterior view of the other embodiment seen in a direction indicated by arrow IV in FIG. 3.
Figure 5:
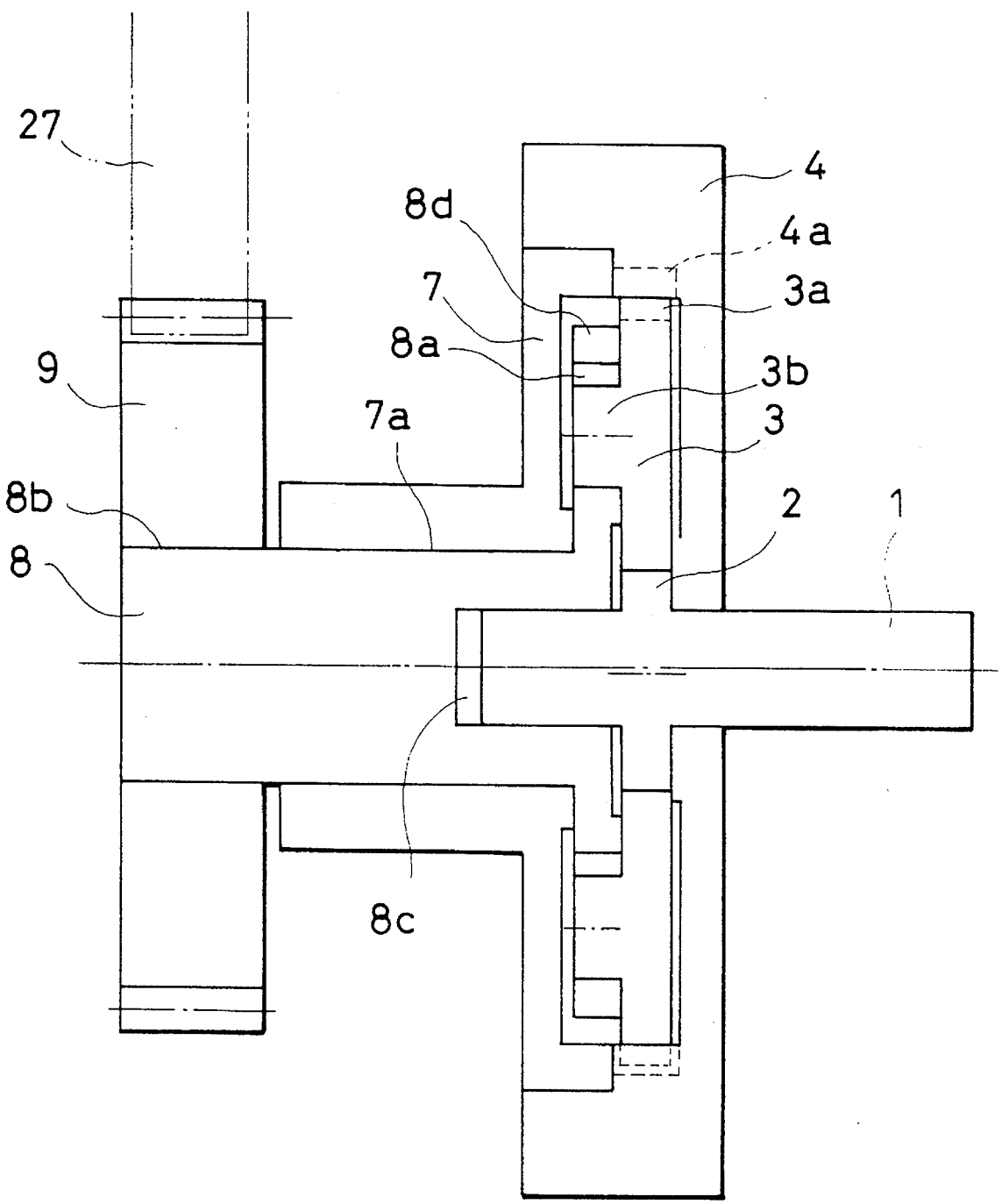
FIG. 5 is a sectional view corresponding to FIG. 1, showing a prior-art example of reduction gears adopting an internal-meshing planetary gear construction.

Incidentally, FIG. 4 is an exterior view with the embodiment seen in the direction of arrow IV indicated in FIG. 3. In this embodiment, the rotation of a motor shaft (an input shaft: a first shaft) 201 is derived as the reduced speed rotation of a pinion gear (an output shaft: a second shaft) 206.

The DC miniature motor 220 is concentrically assembled to an internal gear 204 serving also as a main casing, by a motor coupling screw 228. An eccentric element 202 made of plastics is mounted on the motor shaft 201 by press-in fitting (or by so-called D-cut coupling in which the shaft 201 is partially cut out) so as to be unrotatable relative to this motor shaft 201.

An external gear 203 is rotatably supported around the eccentric element 202. The external gear 203 is integrally formed with inner pins of circular cylindrical shape 203*b* protruding on a circumference which is coaxial with the motor shaft 201. The internal gear 204 is integrally formed with teeth of circular-arc tooth profile 204*a* which internally mesh with the external teeth 203*a* of the external gear 203. Besides, in this embodiment, the internal gear 204 is also used as the motor coupling casing (main casing) as stated before. Accordingly, it is fixed in this embodiment.

The pinion gear (second shaft in the shape of a ring) 206 is rotatably supported on the outer periphery of a bearing part 205*a* which is formed so as to protrude inwards from the side surface of a sub casing 205. As in the first embodiment, the pinion gear 206 is formed with inner pin holes 206*a* into which the respectively corresponding inner pins 203*b* are loosely fitted. The rocking (swaying) of the external gear 203 is absorbed by clearances defined between the inner pin holes 206*a* and the inner pins 203*b*.

The motor shaft 201 is rotatably supported at its one end part in the hole 205*b* of the bearing part 205*a* of the sub casing 205. In addition, the main casing 204 and the sub casing 205 are respectively provided with cutout parts C which serve to bring the external teeth 206*b* of the pinion gear 206 into mesh with the gear 27 of an opposite machine. Besides, the sub casing 205 is fixed to the main casing 204 through a bolt (not shown).

In this embodiment, in order to appropriately keep the meshing between the pinion gear 206 and the opposite gear 27, the spacing or intercentral distance between them is stipulated in the following way: The sub casing 205 is formed with a centering salience 205*c* at an axial position on the outer side thereof. In the case of FIG. 3, an L-leg 230 which has a hole adapted to snugly fit the centering salience 205*c* thereinto and whose height from the corner of the L-shape to the center of the hole has been adjusted is attached to the reduction gears by an L-leg coupling screw 229. Thus, the reduction gears with the L-leg 230 attached thereto have their installation completed merely by assembling them to the designated part of the opposite machine and thereafter fixing the L-leg 30 (keeping the spacing appropriate).

By the way, in the absence of the L-leg 230, the installation surface of the opposite machine is previously formed with a hole adapted to snugly fit the centering salience 205*c* thereinto and a hole for the L-leg coupling screw 229. Thus, the installation on the opposite machine can be completed merely by a screw tightening operation without the necessity of any special centering operation.

Incidentally, the present invention can achieve the same functions as in the foregoing also in involute type planetary (differential) reduction gears, in such a way that a gear is arranged on the outer periphery of a planetary gear supporting plate (carrier).

What is claimed is:

1. Speed change gears adopting an internal-meshing planetary gear construction, comprising a first shaft, an eccentric element with which said first shaft is provided, an external gear which is arranged on an outer periphery of said eccentric element, an internal gear which internally meshes with said external gear, means for absorbing rocking of said external gear, and a second shaft which is connected to said external gear through the absorption means, wherein:

a plurality of inner pins in a circular cylindrical shape are formed on said external gear so as to protrude at points on a circumference which is coaxial with said first shaft;

said second shaft is formed in a ring shape, and is assembled coaxially with said first shaft;

the ring-shaped second shaft is formed with inner pin holes into which said plurality of inner pins are loosely fitted, respectively, and it is also formed with external teeth surrounding an outer peripheral part of the ring; and power transmission with a mating machine which is opposite to said speed change gears is permitted through said external teeth formed at the outer periphery of said ring.

2. The speed change gears adopting an internal-meshing planetary gear construction as defined in claim 1, further comprising a main casing which is unitary with said internal gear, and a sub casing which can be coupled with said main casing; wherein said external gear and said ring-shaped second shaft are accommodated between said main casing and said sub casing, and said casings are partially cut out so as to expose part of said second shaft to said opposite machine.

3. The speed change gears adopting an internal-meshing planetary gear construction as defined in claim 2, wherein said sub casing is protrusively formed with a cylindrical bearing part which is capable of supporting said first shaft, and said ring-shaped second shaft is assembled onto an outer periphery of said bearing part.

* * * * *